(12) United States Patent
Ruhland et al.

(10) Patent No.: US 10,655,950 B2
(45) Date of Patent: May 19, 2020

(54) DEVICE FOR DETERMINING THE QUALITY OF A CORRUGATED BOARD WEB

(71) Applicant: BHS Corrugated Maschinen- und Anlagenbau GmbH, Weiherhammer (DE)

(72) Inventors: Karl Ruhland, Pfreimd (DE); Helmut Kraus, Wackersdorf (DE); Christian Duschner, Luhe-Wildenau (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 0 days.

(21) Appl. No.: 15/563,728

(22) PCT Filed: Mar. 24, 2016

(86) PCT No.: PCT/EP2016/056543
§ 371 (c)(1),
(2) Date: Oct. 2, 2017

(87) PCT Pub. No.: WO2016/156199
PCT Pub. Date: Oct. 6, 2016

(65) Prior Publication Data
US 2018/0073861 A1 Mar. 15, 2018

(30) Foreign Application Priority Data
Apr. 2, 2015 (DE) .................. 10 2015 205 994

(51) Int. Cl.
*B65H 26/02* (2006.01)
*B31F 1/28* (2006.01)
*G01B 11/06* (2006.01)

(52) U.S. Cl.
CPC .......... *G01B 11/0691* (2013.01); *B31F 1/284* (2013.01); *B31F 1/2836* (2013.01);
(Continued)

(58) Field of Classification Search
CPC .... B31F 1/2818; B31F 1/2831; B31F 1/2836; B31F 1/284; B65H 26/02; B65H 2220/03;
(Continued)

(56) References Cited

U.S. PATENT DOCUMENTS

| 4,224,824 A | 9/1980 | Giusti |
| 4,800,286 A | 1/1989 | Brears |

(Continued)

FOREIGN PATENT DOCUMENTS

| DE | 29 06 037 A1 | 9/1979 |
| DE | 44 35 212 A1 | 4/1995 |

(Continued)

*Primary Examiner* — George R Koch
(74) *Attorney, Agent, or Firm* — McGlew and Tuttle, P.C.

(57) ABSTRACT

A device for determining the quality of a moving corrugated board web with at least one cover web and at least one corrugated web. A quality determination sensor arrangement, which includes a first quality determination sensor unit facing the corrugated board web, is provided for determining the quality of the corrugated board web on its first side, and a second quality determination sensor unit, facing a second side of the corrugated board web opposite the first side, for determining the quality of the corrugated board web on its second side. The device includes an evaluation unit that is in signal contact with the quality determination sensor arrangement and evaluates signals from the quality determination sensor arrangement related to the quality of the corrugated board web.

20 Claims, 12 Drawing Sheets

(52) U.S. Cl.
CPC ......... *B65H 26/02* (2013.01); *B65H 2220/03* (2013.01); *B65H 2301/4148* (2013.01); *B65H 2511/13* (2013.01); *B65H 2511/135* (2013.01); *B65H 2557/51* (2013.01); *B65H 2701/1762* (2013.01); *G01B 2210/44* (2013.01)

(58) Field of Classification Search
CPC ........ B65H 2301/4148; B65H 2511/13; B65H 2511/135; B65H 2557/51; B65H 2701/1762; G01B 11/0691; G01B 2210/44; G01N 22/02; G01N 33/346
See application file for complete search history.

(56) References Cited

U.S. PATENT DOCUMENTS

| | | | |
|---|---|---|---|
| 5,437,749 A | | 8/1995 | Pipkorn et al. |
| 5,581,353 A | * | 12/1996 | Taylor .................. B31F 1/2831 250/559.23 |
| 7,952,714 B2 | | 5/2011 | Kraus et al. |
| 2003/0137667 A1 | * | 7/2003 | Reis ...................... B31F 1/2831 356/429 |
| 2005/0284579 A1 | | 12/2005 | Ishibuchi et al. |
| 2006/0278342 A1 | | 12/2006 | Baierl et al. |
| 2009/0091761 A1 | * | 4/2009 | Kraus .................. B31F 1/2831 356/429 |
| 2011/0209809 A1 | | 9/2011 | Casey et al. |

FOREIGN PATENT DOCUMENTS

| | | |
|---|---|---|
| DE | 199 54 301 A1 | 5/2001 |
| DE | 199 55 916 A1 | 5/2001 |
| DE | 199 55 917 A1 | 5/2001 |
| DE | 11 2011 100 759 T5 | 3/2013 |
| EP | 1 101 601 A1 | 5/2001 |
| EP | 2 048 494 A1 | 4/2009 |
| JP | S64-064943 A | 3/1989 |
| JP | 2000-280379 A | 10/2000 |
| JP | 2001-030462 A | 2/2001 |
| JP | 2003-154583 A | 5/2003 |
| JP | 2003-227707 A | 8/2003 |

* cited by examiner

DEVICE FOR DETERMINING THE QUALITY OF A CORRUGATED BOARD WEB

CROSS REFERENCE TO RELATED APPLICATIONS

This application is a United States National Phase application of International Application PCT/EP2016/056543 filed Mar. 24, 2016 and claims the benefit of priority under 35 U.S.C. § 119 of German patent application number DE 10 2015 205 994.4 filed Apr. 2, 2015, the entire contents of which are incorporated herein by reference.

FIELD OF THE INVENTION

The invention concerns a device for determining the quality of a moving corrugated board web with at least one cover web and at least one corrugated web. The invention is also directed at a plant for producing a corrugated board web laminated on at least one side, with at least one such quality determination device.

BACKGROUND OF THE INVENTION

Plants for producing corrugated board webs are generally known from prior art. Due to faults, errors or suchlike it can happen that the quality of the corrugated board web produced does not comply with the target specifications. This can lead to problems during the subsequent processing of the corrugated board web.

SUMMARY OF THE INVENTION

The invention is based on the task of creating a device for determining the quality of a moving corrugated board web that is capable of determining the quality of the moving corrugated board web in an extremely functionally safe way. The device should in particular be capable of determining or detecting even the smallest deviations of the corrugated board web from target specifications with regard to quality. A plant for producing a corrugated board web laminated on at least one side with at least one such quality determination device should also be provided.

This task is solved according to the invention by a device for determining the quality of a moving corrugated board web with at least one cover web and at least one corrugated web, comprising a quality determination sensor arrangement, comprising a first quality determination sensor unit facing a first side of the corrugated board web, for determining the quality of the corrugated board web on its first side, and a second quality determination sensor unit facing a second side of the corrugated board web opposite the first side of the corrugated board web, for determining the quality of the corrugated board web on its second side, and an evaluation unit, which is in signal connection with the quality determination sensor arrangement, and evaluates signals of the quality determination sensor arrangement with regard to the quality of the corrugated board web. Furthermore, this task is solved according to the invention by a plant for producing a corrugated board web laminated on at least one side, comprising at least one device for producing a corrugated board web laminated on one side, and at least one device according to the invention, located after the device for producing the corrugated board web laminated on one side. The core of the invention lies in that an evaluation unit receives signals from the quality determination sensor arrangement and evaluates or determines the quality of the corrugated board web on the basis of these signals. A deviation of the corrugated board web from a target quality or target specification can thus be determined.

The signal connection between the evaluation unit and the quality determination sensor arrangement is preferably wired or wireless.

It is of advantage if the first and/or second quality determination sensor unit works with laser radiation.

The first quality determination sensor unit and the second quality determination sensor unit are favorably arranged substantially opposite each other. The quality determination sensor units are preferably arranged slightly offset from each other, in particular during a calibration process, for example in the transport direction of the corrugated board web. The corrugated board web therefore preferably runs between the first quality determination sensor unit and the second quality determination sensor unit. The quality determination sensor units can favorably be displaced independently from each other.

It is of advantage if the corrugated board web to be checked is twin-layered, triple-layered, five-layered or seven-layered.

The evaluation unit is preferably an electric or electronic evaluation unit.

It is of advantage if the first quality determination sensor unit and/or the second quality determination sensor unit can be displaced transverse to a transport direction of the corrugated board web. Corrugated board webs can be measured or checked for their quality across their width in this way. A displacement speed of the quality determination sensor unit is favorably identical during a measuring process and/or a calibration process.

It is of advantage if the quality determination sensor units are arranged opposite each other during a measuring process and/or their measuring beams are substantially aligned with each other. This design enables a particularly cost effective and complete quality determination of the corrugated board web.

It is of advantage if the first quality determination sensor unit and/or the second quality determination sensor unit can be displaced in a transverse direction of the corrugated board web in such a way that the same is/are capable of determining the quality of the corrugated board web across its entire width. It is of advantage if the first quality determination sensor unit and the second quality determination sensor unit can be displaced synchronously.

It is expedient if the first quality determination sensor unit records a first surface profile of the corrugated board web on its first side. This design allows a particularly exact determination of the quality of the corrugated board web. The first quality determination sensor unit preferably measures the first surface profile. It is for example designed as a surface profile scanner, preferably as a laser surface profile scanner.

The second quality determination sensor unit favourably records a second surface profile of the corrugated board web on its second side. This design also allows a particularly precise determination of the quality of the corrugated board web. The second quality determination sensor unit preferably measures the second surface profile. It is for example designed as a surface profile scanner, more preferably as a laser surface profile scanner.

The evaluation unit is preferably capable of determining a corrugated board web caliber of the corrugated board web, as least in some areas, for determining the quality of the corrugated board web. By determining the corrugated board web caliber compressions and/or bulges can for example be determined in the corrugated board web. Bulges are often the result of insufficient gluing between a cover web and a corrugated web of the corrugated board web.

The evaluation unit is favorably capable of determining a compression depth of a cover web corrugation of the at least one cover web, at least in some areas, for determining the quality of the corrugated board web. By determining the compression depth it can be ascertained whether the cover web corrugation is too deep or too shallow.

The determination of the evenness, in other words the smoothness, of the corrugated board web on its first and/or second side, at least in some areas, performed by the evaluation unit for determining the quality of the corrugated board web provides information about whether the corrugated board web can for example be printed correctly. A correct print image cannot normally be produced on a wavy corrugated board web.

It is of advantage if the evaluation unit is capable of determining imperfections in the corrugated board web for determining the quality of the corrugated board web. The imperfections are for example imperfect splice points, incorrectly glued individual webs or suchlike.

It is of advantage if the evaluation unit is capable of determining a cut edge quality of at least one cut edge of the corrugated board web for determining the quality of the corrugated board web. By determining the cut edge quality of the corrugated board web, or of at least one individual web of the same, it can preferably be ascertained whether at least one cut edge for example has a ridge or a compression.

The design in which the evaluation unit actuates at least one upstream device in dependence on a detected deviation from a target value, wherein the at least one upstream device is in turn capable of reducing the detected deviation, enables a rapid correction during the production of the corrugated board web. Alternatively and/or additionally, faulty sections of the corrugated board web can be removed from the same.

The at least one guide means for guiding the corrugated board web arranged adjacent to the quality determination sensor arrangement and allocated to the corrugated board web, wherein the at least one guide means is preferably arranged above and below the corrugated board web, allows a particularly exact determination of the quality of the corrugated board web, as the corrugated board web is routed through the quality determination sensor arrangement extremely exactly. The at least one guide means and the quality determination sensor arrangement are preferably arranged immediately adjacent to each other. The at least one guide means can be arranged upstream or downstream of the quality determination sensor arrangement here. It is of advantage of the at least one guide means is arranged above and/or below the corrugated board web.

The at least one guide means is favorably in direct contact with the corrugated board web.

The design in which a guide gap of the at least one guide means is changeable allows an adaptation to different corrugated board webs, in particular with different thicknesses.

In one embodiment, the at least one guide means preferably comprises at least one guide roller, more preferably at least one bracket roller that is in contact with the corrugated board web for guiding the same. It is of advantage if exactly one guide roller is envisaged. Alternatively at least two, in particular exactly two guide rollers are for example envisaged. At least one pressure shoe is for example envisaged in place of the at least one guide roller.

It is of advantage if the at least one guide means also comprises at least one guide table for supporting the corrugated board web.

In one embodiment, the at least one guide roller and the at least one guide table are preferably arranged adjacent to each other, and delimit a guide gap, through which the corrugated board web passes.

The guide roller or the pressure shoe form a pressure element, which preferably engages the corrugated board web on a side of the corrugated board web that faces away from the guide table.

The at least one guide roller is set obliquely in relation to the corrugated board web and preferably encloses an angle that lies between 2° and 20°, preferably between 3° and 10°, with the corrugated board web in relation to a vertical alignment to the transport direction or longitudinal direction of the corrugated board web. The diagonal positioning of the at least one guide roller means that vibrations of the corrugated board web are particularly easy to prevent, which would otherwise falsify the measurement result. The at least one guide roller preferably always lies on at least two corrugation peaks of the corrugated board web and does not engage the corrugation troughs of the corrugated board web.

The quality of the corrugated board web can also be determined extremely exactly by the design in which a calibration arrangement is provided for calibrating the quality determination sensor arrangement. It is of advantage if a deviation of the quality determination sensor arrangement from a target specification can be detected here and this deviation is then taken into consideration during the quality determination of the corrugated board web. It is of advantage if a calibration is carried out when the plant for producing a corrugated board web laminated on two sides is started and/or at each interruption of the corrugated board web.

The at least one calibration part of the calibration arrangement, arranged at the second quality determination sensor unit, for reflecting a first measuring beam of the first quality determination sensor unit back to the first quality determination sensor unit in the absence of a corrugated board web, wherein the at least one calibration part preferably extends transverse to the transport direction of the corrugated board web, preferably has a level calibration surface that faces the first quality determination sensor unit. The at least one calibration part is preferably designed as a plate, rail, bridge, block or suchlike. It is of advantage if the at least one calibration part extends only across a fraction of the width of the corrugated board web.

The at least one calibration part is preferably in connection with the second quality determination sensor unit, preferably directly or indirectly. It is then favorably displaceable together with the second quality determination sensor unit.

Alternatively the at least one calibration part is for example displaceably mounted on a guide for guiding the second quality determination sensor unit. It is then preferably displaceable, in particular pushable or pivotable, between a calibration position and a non-calibration position.

The design in which the calibration arrangement comprises at least one measuring reference element results in extremely high measuring accuracy.

A first transversing axis of the first and/or second quality determination sensor unit can for example firstly be set to 0/zero and synchronized by means of a start reference element. For this the at least one start reference element preferably has a start reference edge. At least one end reference element is also favorably provided, arranged at a distance from the at least one start reference element and preferably having an end reference edge. A balancing of a measured distance between the reference elements with the known distance between the same favorably follows. This is taken into consideration during the evaluation. A second transversing axis can secondly preferably set to 0/zero and synchronized on the start reference element, the same running perpendicular to the transversing axis and preferably extending vertically. The at least one start reference element favorably has a known thickness for this. A balancing of the thickness measured with the quality determination sensor units with the known thickness favorably follows. This is taken into consideration during the evaluation.

The offset of the first quality determination sensor unit and the second quality determination sensor unit from each other in a transport direction of the corrugated board web is favorably as small as possible during a measuring process in order to measure substantially opposing areas of the corrugated board web during the measuring process. The offset of the quality determination sensor units in transport direction of the corrugated board web allows a particularly easy or precise calibration of the first and/or second quality determination sensor unit/s.

Alternatively for example no offset lies between the quality determination sensor units in transport direction of the corrugated board web.

In one embodiment, the first and second quality determination sensor units favorably here are offset very little or as little as possible from each other transverse to the transport direction of the corrugated board web during a calibration process. A particularly easy or precise calibration is possible in this way as well. Substantially no offset at all preferably lies between these during a measuring process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
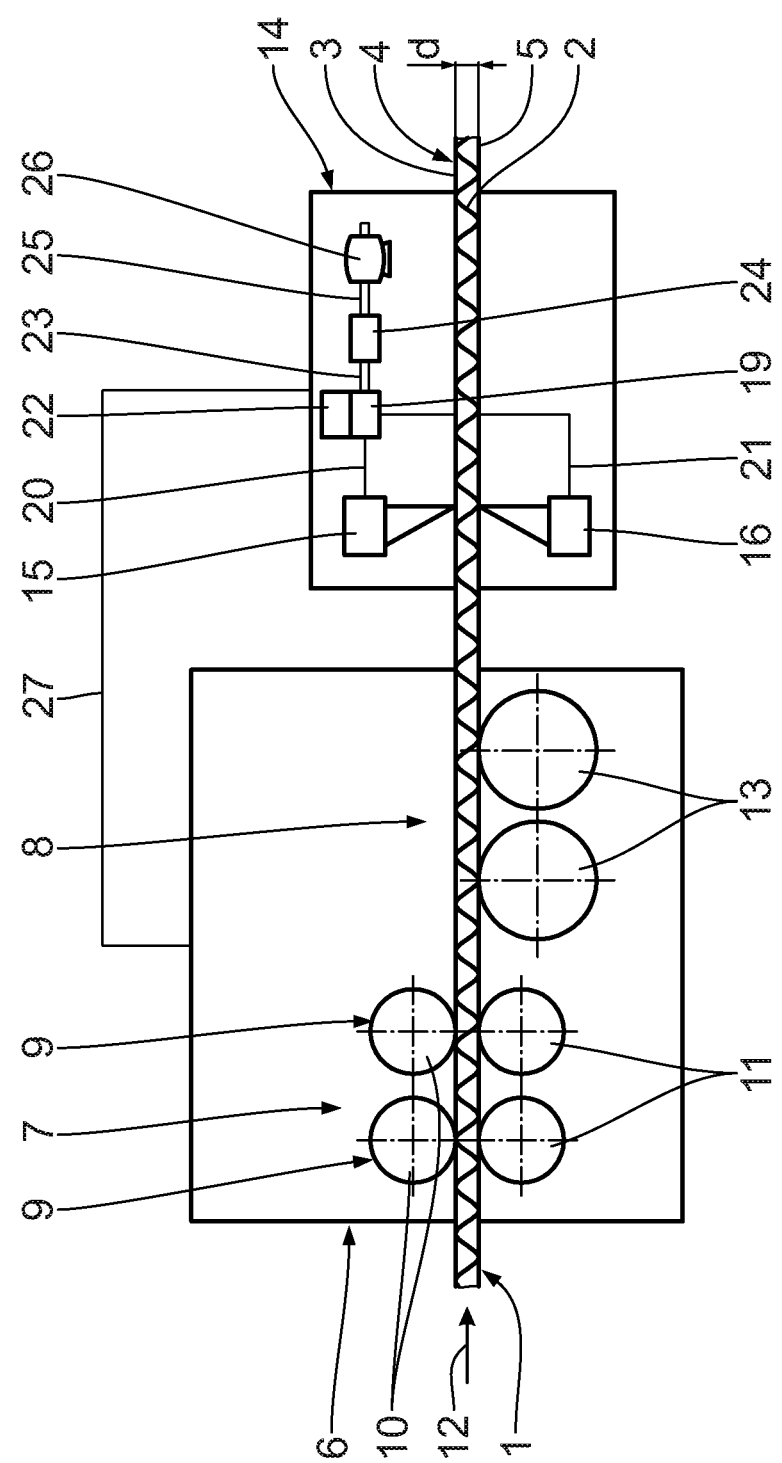
FIG. 1 is a schematic side view of a part of a plant according to the invention for producing a corrugated board web.

A plant for producing a corrugated board web 1 laminated on both sides comprises a corrugated board production device (not shown) with a grooving means and a glue application means. The grooving means serves for producing a corrugated web 2 from an endless material web. For this it comprises two rotatably driven corrugated rollers, which form a gap for passing through and corrugating the endless material web. The glue application means has a glue trough and a glue application roller as well as a glue dosing roller. Glue is located in the glue trough. The glue dosing roller is arranged inside the glue trough. It lies around the circumference of the glue application roller and serves for forming an even glue layer on the glue application roller. The glue application roller forms a gap with one of the corrugated rollers for passing through the corrugated web 2 and for gluing said corrugated web 2. The corrugated board production device comprises a pressing means for pressing the corrugated web 2 equipped with glue from the glue trough against an endless smooth first material web or cover web 3, which for example comprises a pressing roller or a pressing belt.

The endless corrugated board web 4 laminated on one side, produced in the corrugated board production device, is routed through a pre-heating means (not shown) comprising two heatable rollers arranged one above the other. The corrugated board web 4 laminated on one side and an endless, smooth second material web or cover web 5 run above each other in the preheating means and partially embrace the relevant heated roller.

A gluing station (not shown) with a gluing roller submersed in a glue bath is arranged downstream of the pre-heating means. The corrugated web 2 of the corrugated board web 4 laminated on one side is in contact with the gluing roller, so that the same is equipped with glue.

A heated pressing device (not shown) with a heated table and a pressing means above the same is arranged downstream of the gluing station. The corrugated board web 4 laminated on one side and the second cover web 5 are routed through a gap delimited by the pressing means and the heated table, where the corrugated board web 4 laminated on one side and the second cover web 5 are pressed together and glued to each other. The corrugated board web 1 laminated on both sides, or three-layered, is formed in the heated pressing device.

A longitudinal cutting/grooving device 6 comprising a grooving means 7 and a longitudinal cutting means 8 is arranged downstream of the heated pressing device. The grooving means 7 in turn comprises two grooving stations 9 arranged behind each other, which each comprise a grooving tool 10 and a counter-grooving tool 11 associated with the same. The grooving tools 10 and the counter-grooving tools 11 can be rotatably driven. When the grooving tools 10 and the counter-grooving tools 11 are in their engaged or grooving position, longitudinal grooving or longitudinal grooves can be produced in the corrugated board web 1 transported in transport direction 12 by means of each pair of grooving tools 10 or counter-grooving tools 11. The longitudinal cutting means 8 comprises two longitudinal cutting stations 13 arranged behind each other. Each longitudinal cutting station 13 has a rotatably driveable blade, which can be engaged with the corrugated board web 1 for longitudinal separation of the same whilst forming individual part webs.

A quality determination device 14 capable of determining the quality of the corrugated board web 1 is arranged downstream of the longitudinal grooving device 6. The grooved corrugated board web 1 divided into part webs passes through the quality determination device 14. The quality determination device 14 is in signal connection with the longitudinal cutting/grooving device 6 via a signal line 27. Alternatively a wireless connection is provided.

The quality determination device 14 comprises a first laser sensor unit 15 and a second laser sensor unit 16. The first laser sensor unit 15 is arranged above the corrugated board web 1, whilst the second laser sensor unit 16 is arranged below the corrugated board web 1. The corrugated board web 1 thus passes between the two laser sensor units 15, 16. An alternative reverse arrangement of the laser sensor units 15, 16 is possible.

The laser sensor units 15, 16 are arranged a little offset from each other in transport direction 12 of the corrugated board web 1. The first laser sensor unit 15 is preferably arranged upstream of the second laser sensor unit 16. The laser sensor units 15, 16 together form a laser sensor arrangement.

The laser sensor units 15, 16 can be displaced synchronously transverse to the transport direction 12 of the corrugated board web 1 and transverse to the corrugated board web 1 alongside of guides 17 or 18 by means of drives not shown here.

The first laser sensor unit 15 is capable of measuring a first surface profile of the corrugated board web 1 or the first cover web 3 when being displaced along the guide 17, whilst the second laser sensor unit 16 is capable of measuring a second surface profile of the corrugated board web 1 or the second cover web 5 when being displaced along the guide 18. The laser sensor units 15, 16 are in particular capable of measuring depressions in the corrugated board web 1 and/or elevations projecting from the actual corrugated board web 1.

The quality determination device 14 comprises a bracket roller 28 arranged upstream of the laser sensor units 15, 16. The bracket roller 28 is arranged above the corrugated board web 1 and is in direct contact with the same. A support body 29 carrying or supporting the corrugated board web 1 there is located below the bracket roller 28. The corrugated board web 1 is routed exactly by the bracket roller 28 and the table-like support body 29, which increases the accuracy of the laser sensor arrangement.

A calibration part 30 that projects further than the second laser sensor unit 16 in the direction of the corrugated board web 1 or the first laser sensor unit 15 is arranged on the second laser sensor unit 16 or on its carriage. The calibration part 30 has a calibration bridge 31 with a calibration surface 32 facing the first laser sensor unit 15, which extends at a distance below the corrugated board web 1. The calibration surface 32 extends horizontally or parallel to the corrugated board web 1.

If no corrugated board web 1 is near the laser sensor arrangement a laser beam 33 of the first laser sensor unit 15 will hit the calibration surface 32 from above for calibration, which allows a calibration of the first laser sensor unit 15 or the laser sensor arrangement. The two laser sensor units 15, 16 are both synchronously displaced parallel across the entire working width during calibration.

The measurement values determined by the laser sensor units 15, 16 are supplied to an evaluation unit 19 via signal lines 20 or 21. Alternatively a wireless connection is provided.

The position of the longitudinal groove/s in the first and/or second cover web 3 or 5 transverse to the transport direction 12 can for example be determined and evaluated in the evaluation unit 19. The relevant position of an outer edge of a part web in relation to at least one longitudinal cut, namely the width of the relevant part web, can also be determined and evaluated. It is possible to determine whether the layers of the corrugated board web 1 are positioned correctly in relation to each other by evaluating the position of the longitudinal grooves in the first and second cover web 3 or 5 and the at least one longitudinal cut and the outer edges. The distance of the longitudinal groove/s from the relevant outer edge and/or the distance of the longitudinal groove/s of the part web/s from the at least one longitudinal cut can for example also be determined and evaluated. The thickness d of the corrugated board web 1 can be determined and evaluated in the evaluation means by means of the distance to the first cover web 3 determined by the first laser sensor unit 15 and the distance to the second cover web 5 determined by the second laser unit 16.

The evaluation means 19 is preferably associated with a display unit 22.

A controller 24 is in signal connection with the evaluation unit 19 via a signal line 23. Alternatively a wireless connection is provided. A drive motor 26 is in signal connection with the controller 24 via a signal line 25. Alternatively a wireless connection is envisaged. The drive motor 26 is preferably part of a cross-cutter (not shown) located after the quality determination device 14. A web section classified as not correct can be cut out of the corrugated board web 1 by means of the cross-cutter. Such a faulty web section can preferably be disposed of by means of a switch located after the cross-cutter. The longitudinal grooving device 6 can also be controlled by the controller 24.

Alternatively the drive motor 26 is favorably a part of the longitudinal grooving device 6. The grooving device 7 and/or longitudinal cutting means 8 is preferably controllable in such a way that corresponding detected deviations of the corrugated board web 1 are for example rectified immediately.

Figure 3:
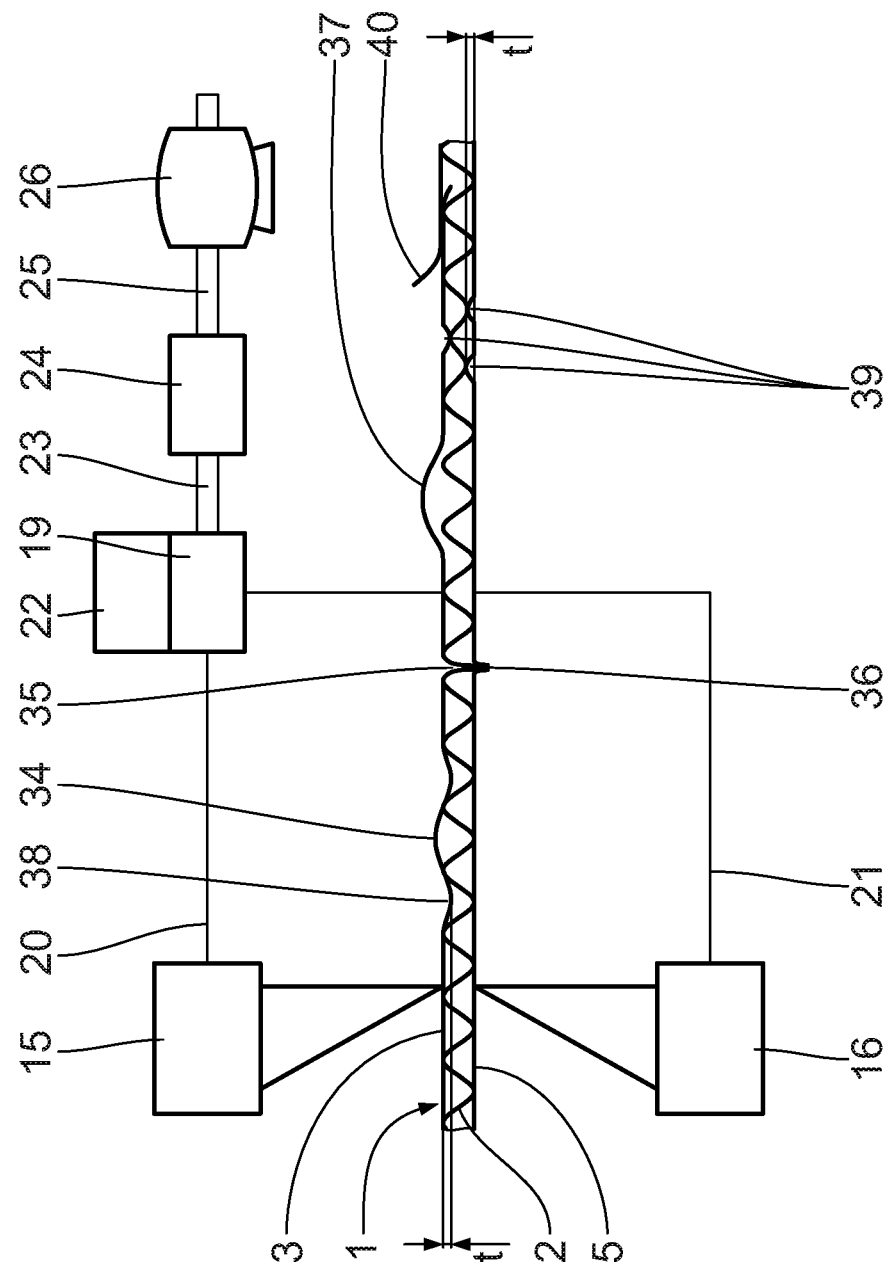
FIG. 3 is a side view of the device for determining the quality of a corrugated board web corresponding to FIG. 1, wherein the corrugated board web comprises various faults for explanation purposes.

Various defects of a corrugated board web 1 that can be detected with the quality determination device 14 are shown in FIG. 3.

Elevations 34 in the first and/or second cover web 3 or 5 can for example be detected and their height determined. Incisions 35 or ridge formations 36 in the first and/or second cover web 3 or 5 can for example be detected. The depth t of the incisions 35 can in particular also be determined. An insufficient gluing 37 of the first and/or second cover web 3 or 5 to the corrugated web 2 can for example be detected. A depression 38 in the first and/or second cover web 3 or 5 can for example be detected. Their depth t can in particular also be determined. Longitudinal grooves 39 in the first and/or second cover web 3 or 5 can for example be detected. Their position and depth t can for example be determined. Surplus layers or material pieces 40 can for example be detected.

Figure 2:
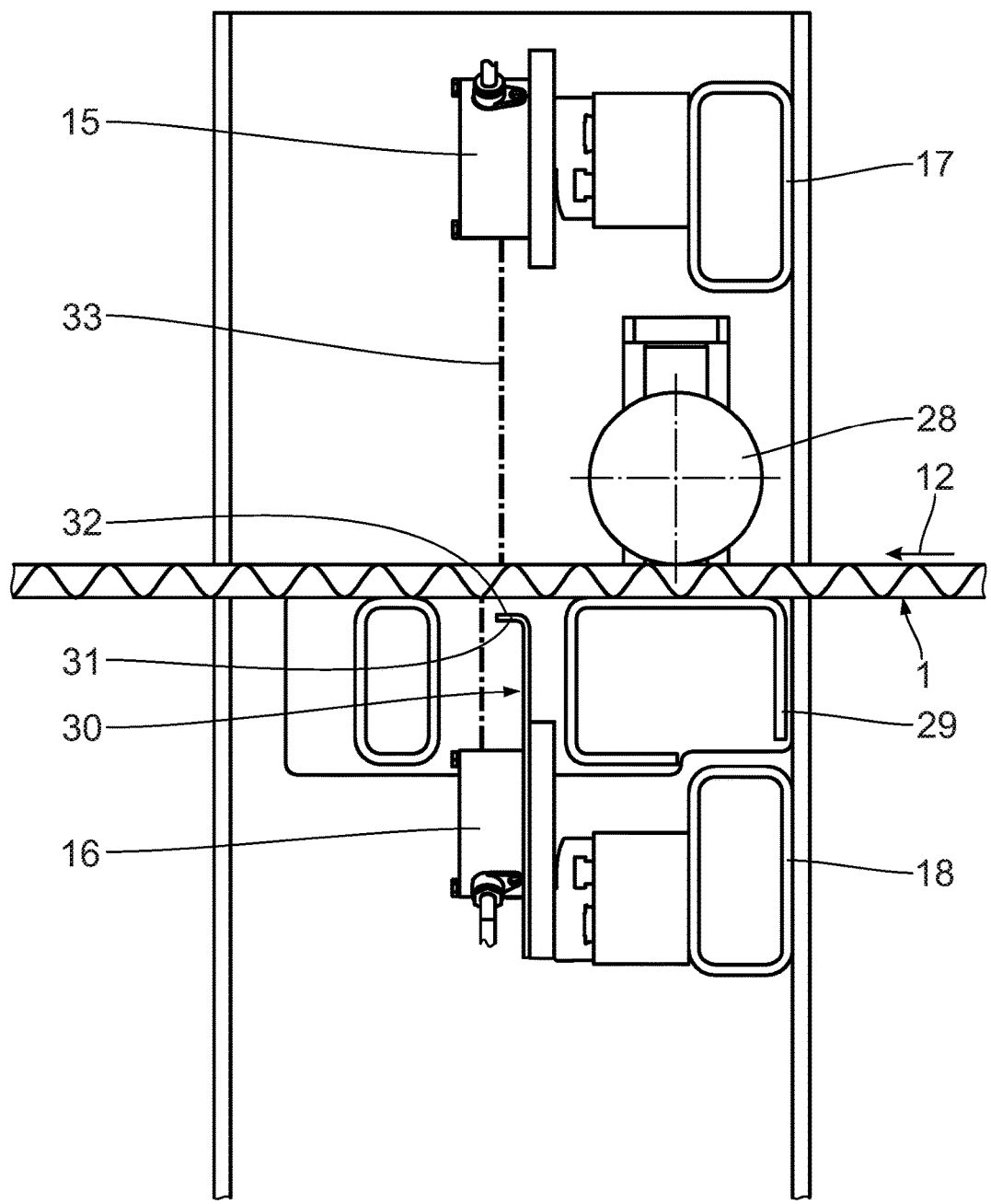
FIG. 2 is a side view of the device for determining the quality of a corrugated board web illustrated in FIG. 1, showing details.
Figure 5:
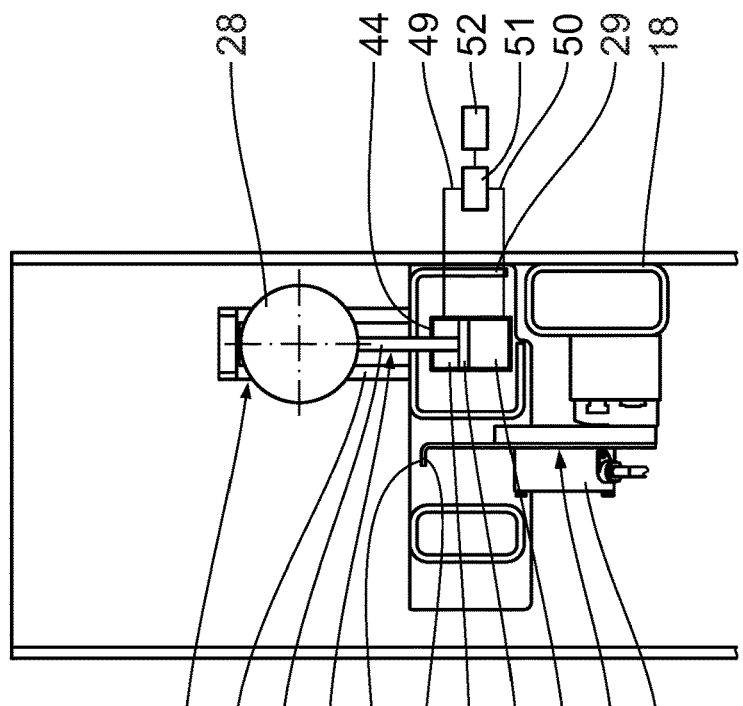
FIG. 5 is a side view of the device for determining the quality of the corrugated board web shown in FIG. 1, wherein the guide roller is in its position that is elevated from the corrugated board web here, contrary to FIG. 4.
Figure 4:
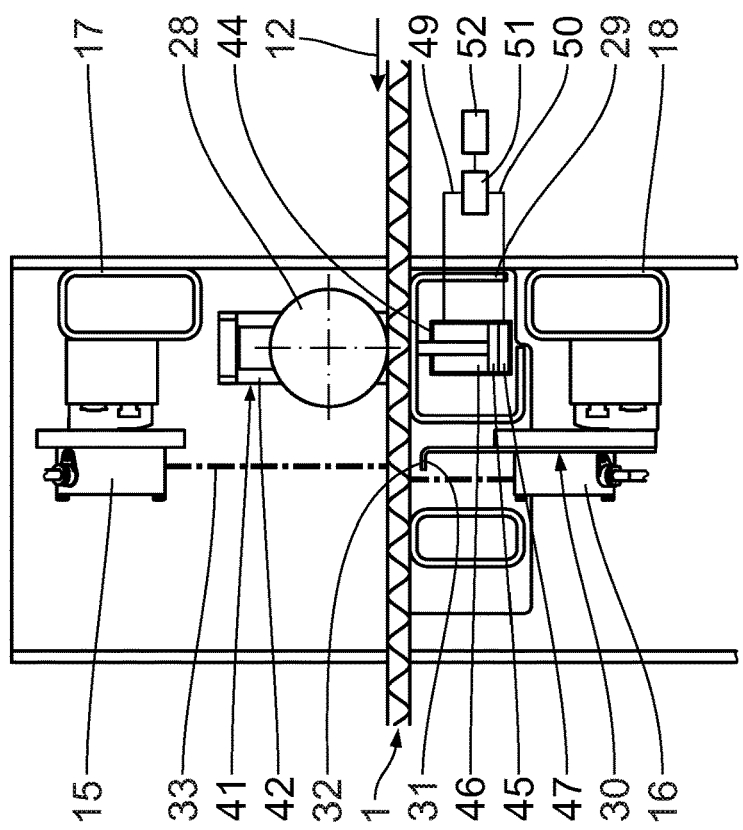
FIG. 4 is a side view corresponding to FIG. 2, demonstrating further details of the device for determining the quality of a corrugated board web compared to FIG. 2.

The quality determination device 14 illustrated in FIG. 2 is shown in more detail in FIGS. 4 and 5, to which we refer hereafter. We refer to the preceding associated description. The bracket roller 28 is vertically displaceable in relation to the transport direction 12 and a transverse direction of the corrugated board web 1, i.e. in its height, by means of a bracket roller adjustment means 41. The distance of the bracket roller 28 to the support body 29 can thus be changed, namely enlarged or reduced, with the bracket roller adjustment means 41, which leads to a corresponding change in the guide gap. The quality determination device 14 can therefore be adjusted to different corrugated board webs 1, in particular with different thicknesses, streams or suchlike, and/or to different transport speeds 12 of the corrugated board web 1. A pressing pressure of the bracket roller 28 against the corrugated board web 1 can for example also be changed in this way.

The bracket roller adjustment means 41 has at least one guide rod 42, which favorably extends vertically and guides the bracket roller 28 during its adjustment.

The bracket roller adjustment means 41 also has a displacement means 43, which directly or indirectly engages the bracket roller 28. The displacement means 43 preferably works pneumatically.

The displacement means 43 here has a cylinder housing 44, preferably fixed to the support body 29, and a piston 45 held axially displaceably in the cylinder housing 44, which divides the cylinder housing 44 into a first working chamber 46 and a second working chamber 47. A piston rod 48 is connected with the piston 45, is guided out of the cylinder housing 44, and directly or indirectly engages the bracket roller 28.

A first fluid line 49 opens into the first working chamber 46, whilst a second fluid line 50 opens into the second working chamber 47. Each fluid line 49, 50 is connected to a pressure generation unit 51, which is preferably designed as a compactor or compressor.

A controller 52 is connected with the pressure generation unit 51 for controlling said pressure generation unit 51. Depending on the control of the pressure generation unit 51 by the controller 52 the first working chamber 46 is filled with compressed air via the first fluid line 49, or the second working chamber 47 with filled with compressed air via the second fluid line 50.

Depending on the supply of the first working chamber 46 or the second working chamber 47 with compressed air the piston 45, and therefore also the piston rod 48 connected with the same, is axially displaced, which in turn leads to a corresponding displacement or adjustment of the bracket roller 28.

Alternatively the bracket roller adjustment means 41 can for example work hydraulically. Alternatively this has for example a spindle drive for displacing the bracket roller 28. Alternatively the corrugated board web 1 is for example supplied only with the own weight of the bracket roller 28.

Figure 6:
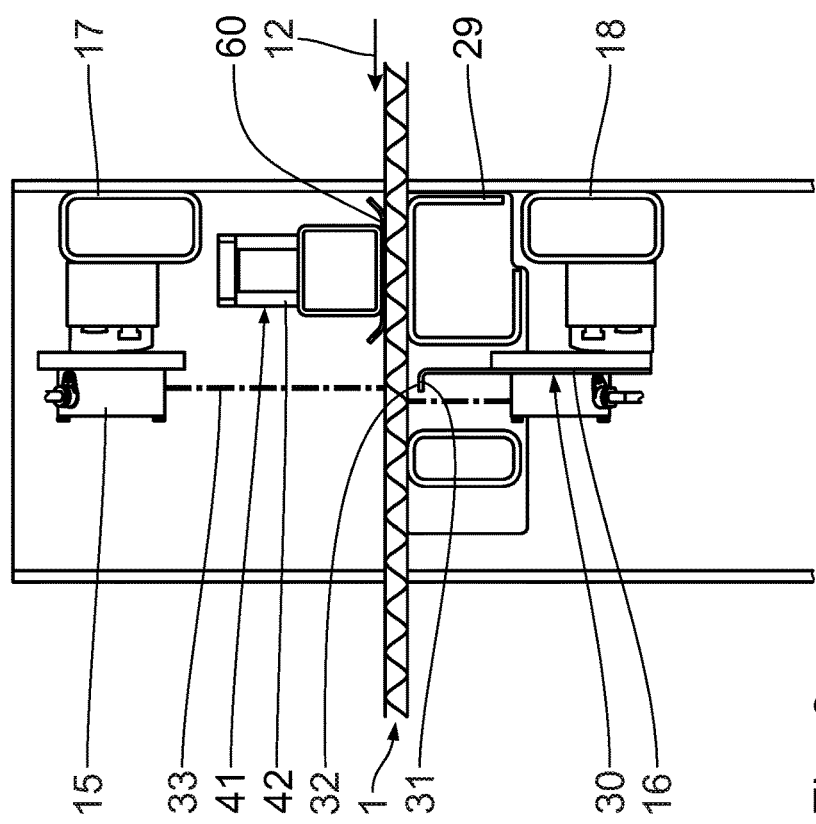
FIG. 6 is a side view of a device for determining the quality of a corrugated board web according to a second embodiment, comprising a pressure shoe instead of a guide roller.

A further embodiment of the quality determination device 14 is described hereafter with reference to FIG. 6. Contrary to the previous embodiment, to which we refer, a pressure shoe 60 arranged above the corrugated board web 1 and in direct contact with the same is provided instead of the bracket roller 28. The pressure shoe 60 is height adjustable. The adjustment means 41 can be used for this.

Figure 7:
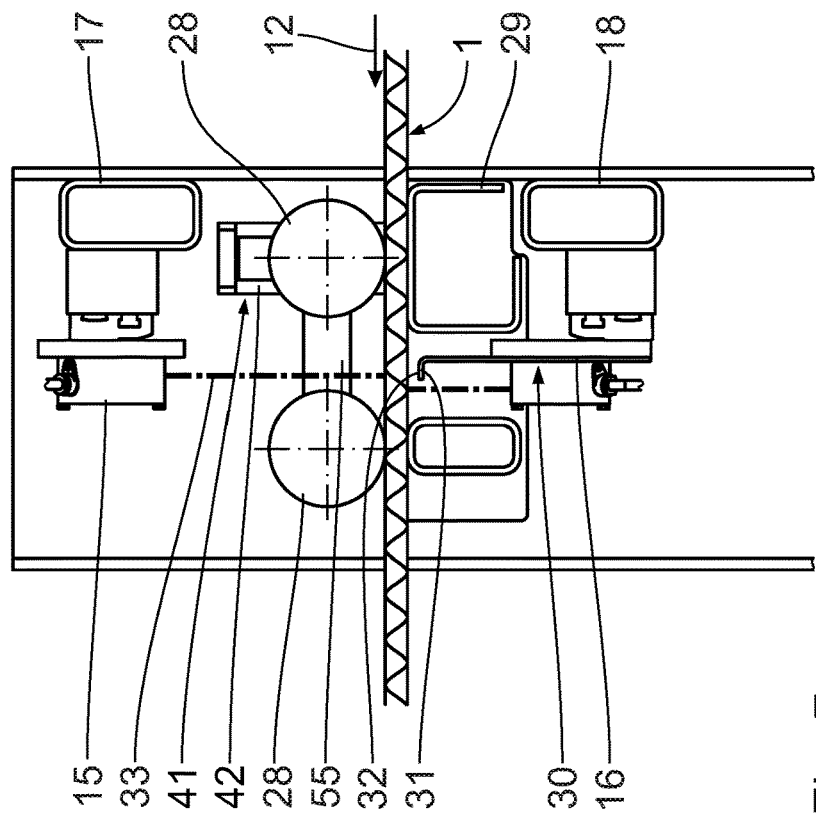
FIG. 7 is a side view of a device for determining the quality of a corrugated board web according to a third embodiment, comprising two guide rollers instead of one guide roller.
Figure 8:
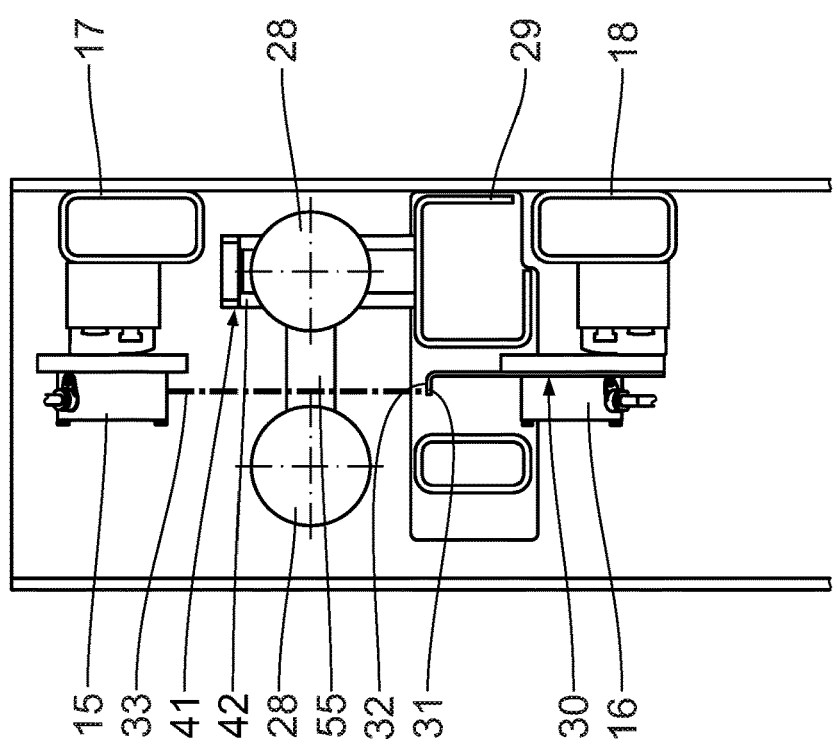
FIG. 8 is a view of the device for determining the quality of a corrugated board web according to FIG. 7, wherein the guide rollers are here in their position that is elevated from the corrugated board web, contrary to FIG. 7.

A further quality determination device 14 is described hereafter with reference to FIGS. 7, 8. Contrary to the quality determination device 14 according to FIG. 2 this has two bracket rollers 28 arranged behind each other in transport direction 12 of the corrugated board web 1.

The bracket rollers 28 are here arranged in pairs and extend parallel to each other. They are coupled to each other via a rigid coupling means 55, so that both bracket rollers 28 can be height displaced or adjusted together. The adjustment means 41 can be used for this adjustment.

The bracket rollers 28 are arranged in such a way that the laser beam 33 of the first laser sensor unit 15 meets the corrugated board web 1 from above between the same. The bracket rollers 28 are favorably designed identically. Alternatively these are different.

In FIG. 7 the bracket rollers 28 are in direct contact with the corrugated board web 1, through which the same is passed. They lie on the top of the corrugated board web 1. In FIG. 8 the same are in their upper position. They are elevated from the corrugated board web 1 (not shown).

Figure 9:
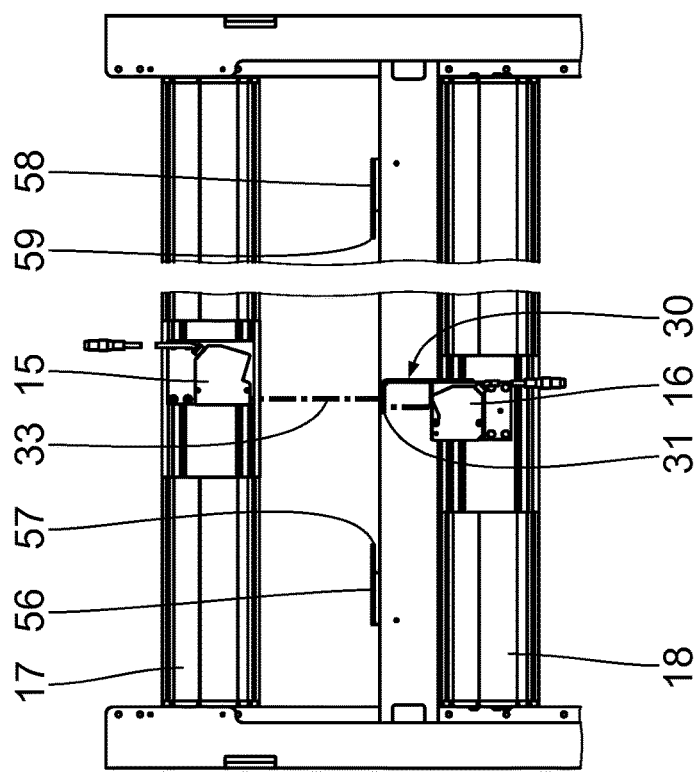
FIG. 9 is a side view of a device for determining the quality of a corrugated board web according to a fourth embodiment.

With the embodiment in FIG. 9 the laser sensor units 15, 16 are offset from each other transverse to the transport direction 12 of the corrugated board web 1 during a calibration process, so that their laser beams are also correspondingly offset from each other transverse to the transport direction 12 of the corrugated board web 1. The laser sensor units 15, 16 drive at the same speed across the working width during the calibration process here, although correspondingly offset from each other. During the actual measuring process the laser sensor units 15, 16 are arranged opposite each other and drive at an identical speed, wherein their laser beams are substantially aligned with each other.

As is clear from FIG. 9, the calibration bridge 31 has a width that is a mere fraction of the width or the working width of the corrugated board web 1. The calibration part 30 can be displaced across the entire width or the working width of the corrugated board web 1. It is fitted to the second laser sensor unit 16 or its carriage for this.

Because of the displacement of the first calibration part 30 with the second laser sensor unit 16 the sag of the guides 17, 18 carrying or guiding the laser sensor units 15, 16 is detectable. The guides 17, 18 can change, in particular sag during operation due to thermal influences.

Figure 11:
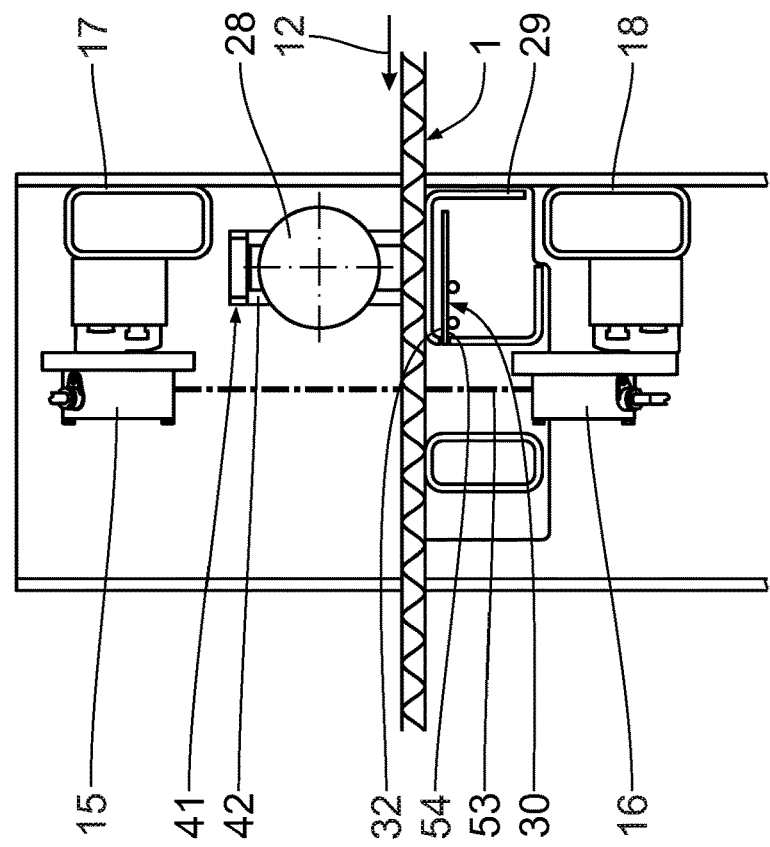
FIG. 11 is a side view of the device for determining the quality of a corrugated board web illustrated in FIG. 10, wherein the calibration plate of the same is here in a retracted position, contrary to FIG. 10.
Figure 10:
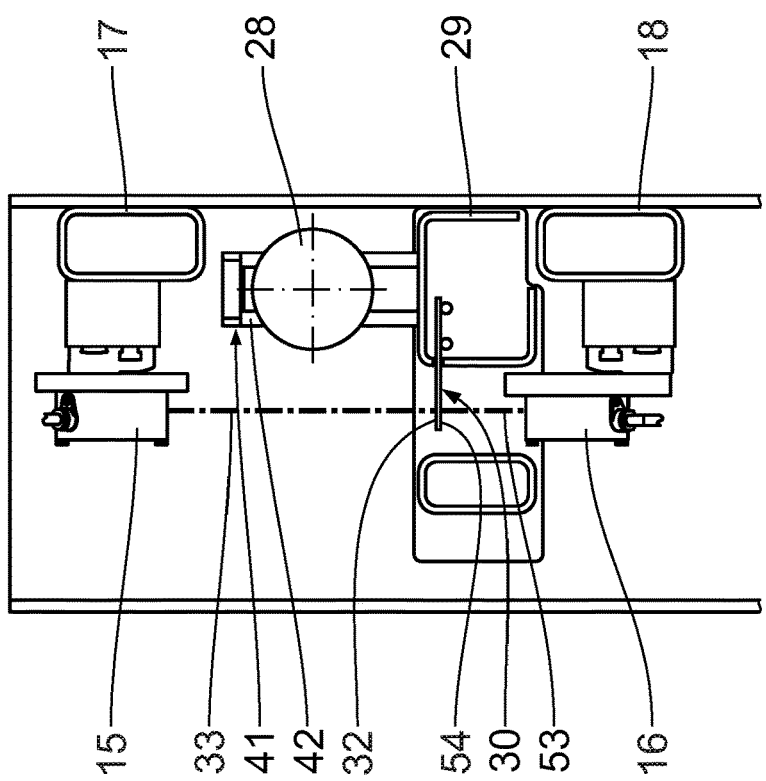
FIG. 10 is a side view of a device for determining the quality of a corrugated board web according to a fifth embodiment.

With an alternative embodiment of the quality determination device 14 according to FIGS. 10, 11 the calibration part 30 is designed as a calibration plate that can be displaced, in particular driven, between a calibration position (FIG. 10) and a non-calibration position (FIG. 11). The calibration part 30 extends horizontally or parallel to an adjacent section of the corrugated board web 1.

In the calibration position the laser beam 33 impacts upon the calibration surface 32 from above for calibration, which allows a calibration of the first laser sensor unit 15 or the laser sensor arrangement. The quality determination device 14 contains no corrugated board web 1 here. A laser beam 53 of the second laser sensor unit 16 impacts upon a second calibration surface 54 of the calibration part 30 from below, which allows a calibration of the second laser sensor unit 16 or the laser sensor arrangement. The second calibration surface 54 is arranged opposite the calibration surface 32, which forms a first calibration surface 32. The calibration part 30 can be displaced substantially parallel to an adjacent section of the corrugated board web 1. It is correspondingly guided for this.

The calibration part 30 is preferably in its non-calibration position when the corrugated board web 1 passes through the quality determination device 14 and is checked for quality.

Figure 12:
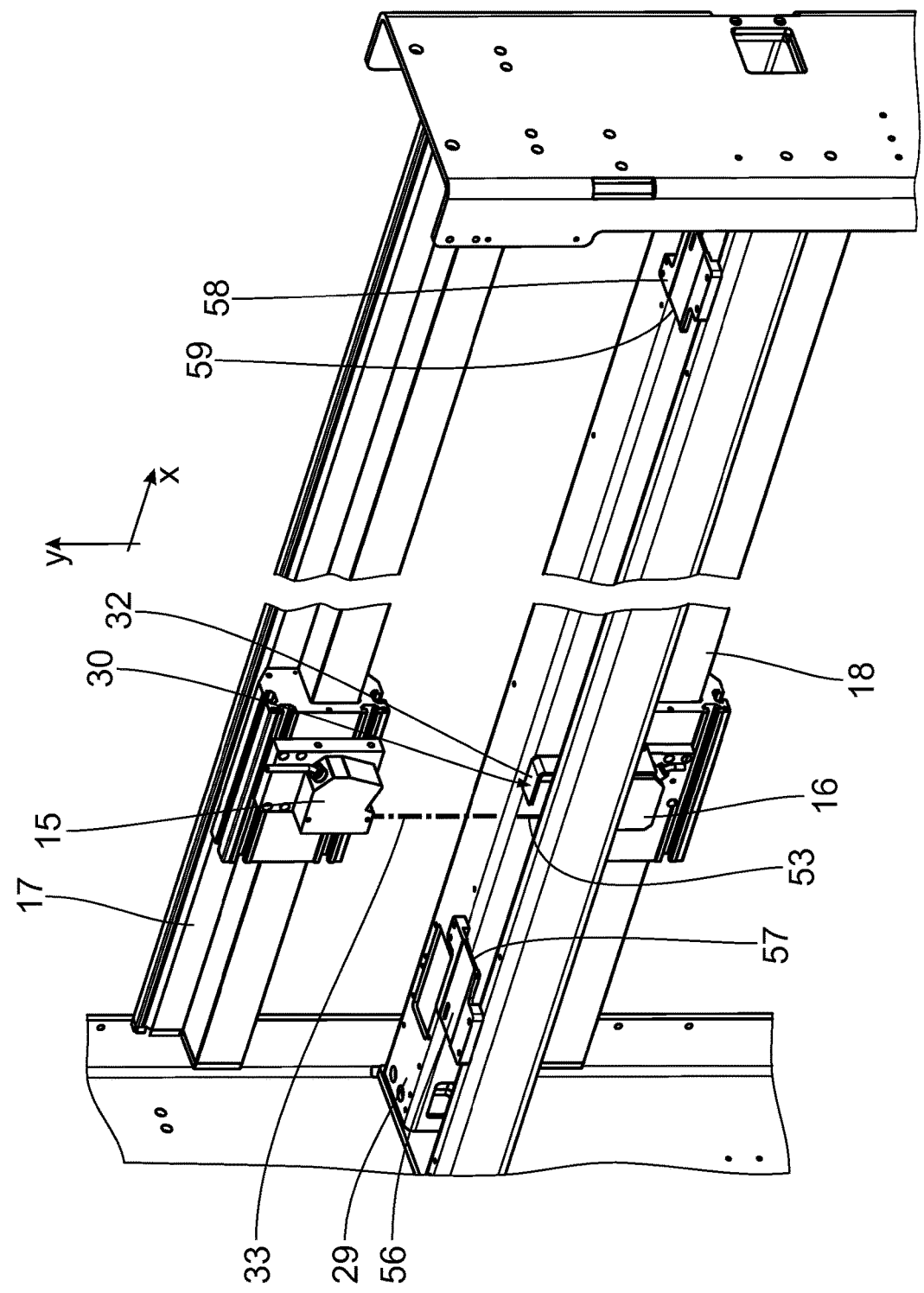
FIG. 12 is a perspective part view of a device for determining the quality of a corrugated board web.

A part of the quality determination device 14 is shown in perspective in FIG. 12. It comprises a start reference element 56 with an inner start reference edge 57 and an end reference element 58 with an inner end reference edge 59. The reference elements 56, 58 are arranged at a distance from each other. They are arranged at a distance from each other along the transverse direction of the corrugated board web 1. The reference elements 56, 58 are arranged in opposing end areas of the working width or adjacent to the longitudinal edges of the corrugated board web 1.

The reference elements 56, 58 are favorably plate-shaped. They preferably lie on a common plane and are preferred to extend horizontally. The reference edges 57, 59 face each other and extend parallel to each other. They extend parallel to the longitudinal edges of the corrugated board web 1. The distance of the reference edges 57, 59 from each other is known.

A change or deviation in the distances between the reference edges 57, 59, which is primarily due to thermal influences, can be detected. This detected change is later taken into consideration during the determination of the quality of the corrugated board web 1 or during the evaluation of corresponding signals.

FIGS. 13 to 17 show the laser sensor units 15, 16 during use.

Figure 13:
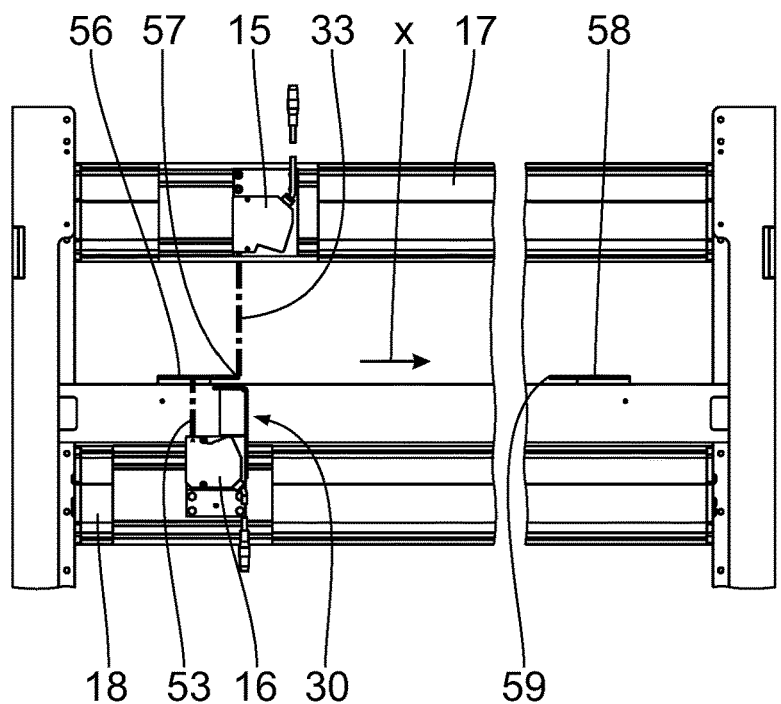
FIG. 13 is a view of a device for determining the quality of a corrugated board web for showing an example of an individual process step.

FIG. 13 shows how the first laser sensor unit 15 is set to 0/zero. The first laser sensor unit 15, and preferably also the second laser sensor unit 16, are displaced towards the start reference element 56 prior to the calibration process. The laser beam 33 of the first laser sensor unit 15 is located near the start reference edge 57. The laser beam 53 of the second laser sensor unit 16 preferably impacts upon the start reference element 56 from below.

A horizontal transversing axis x of the first laser sensor unit 15 extending between the reference elements 56, 58 is set to 0/zero and synchronized at the start reference element 56.

Figure 14:
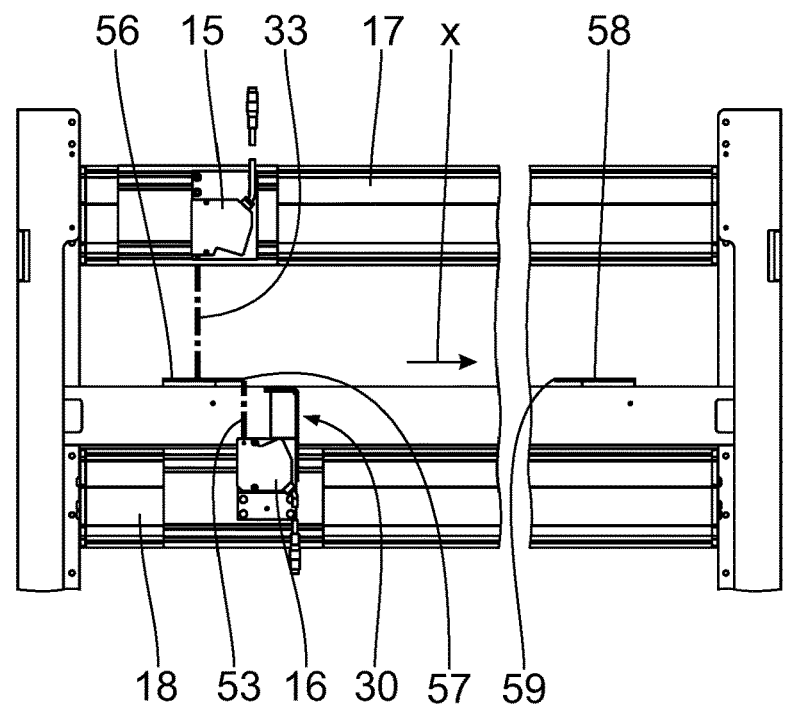
FIG. 14 is a view of the device of FIG. 13 for determining the quality of a corrugated board web for showing an example of another individual process step.

FIG. 14 shows how the second laser sensor unit 16 is set to 0/zero. The laser beam 53 of the second laser sensor unit 16 is her located at the start reference edge 57. The laser beam 33 of the first laser sensor unit 15 here favorably impacts upon the start reference element 56 from above.

A horizontal transversing axis x of the second laser sensor unit 16 extending between the reference elements 56, 58 is set to 0/zero and synchronized at the start reference element 56.

Figure 15:
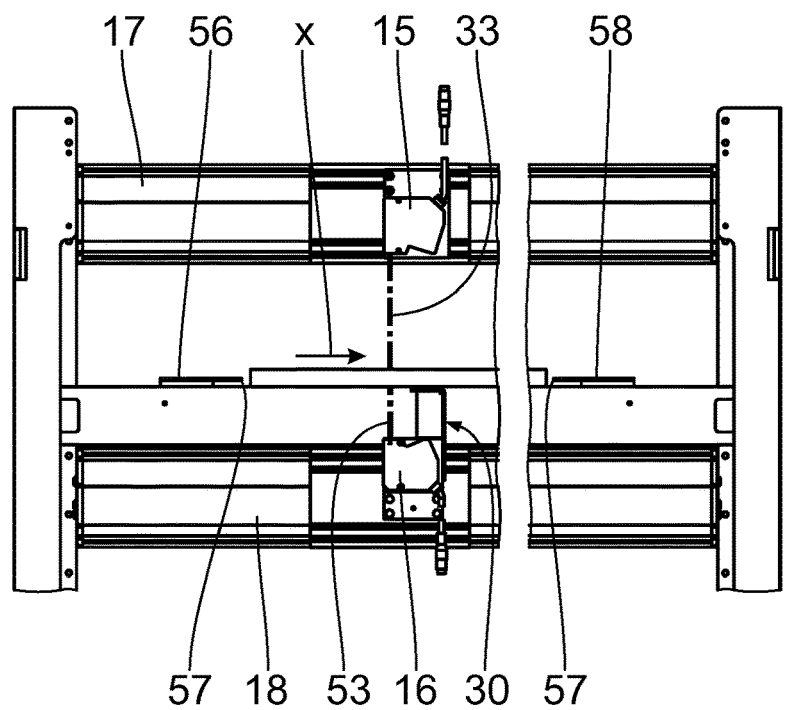
FIG. 15 is a view of a device of FIG. 13 for determining the quality of a corrugated board web for showing an example of another individual process step.

FIG. 15 shows the actual measurement for determining the quality of the corrugated board web 1. The laser sensor units 15, 16 are displaced away from the start reference element 56 and their laser beams 33, 53 impact upon the corrugated board web 1 in opposing areas, which scans the same by way of examination. The laser beams 33, 53 are located between the reference elements 56, 58 and are substantially aligned with each other. The laser sensor units 15, 16 are substantially not offset from each other here.

Figure 16:
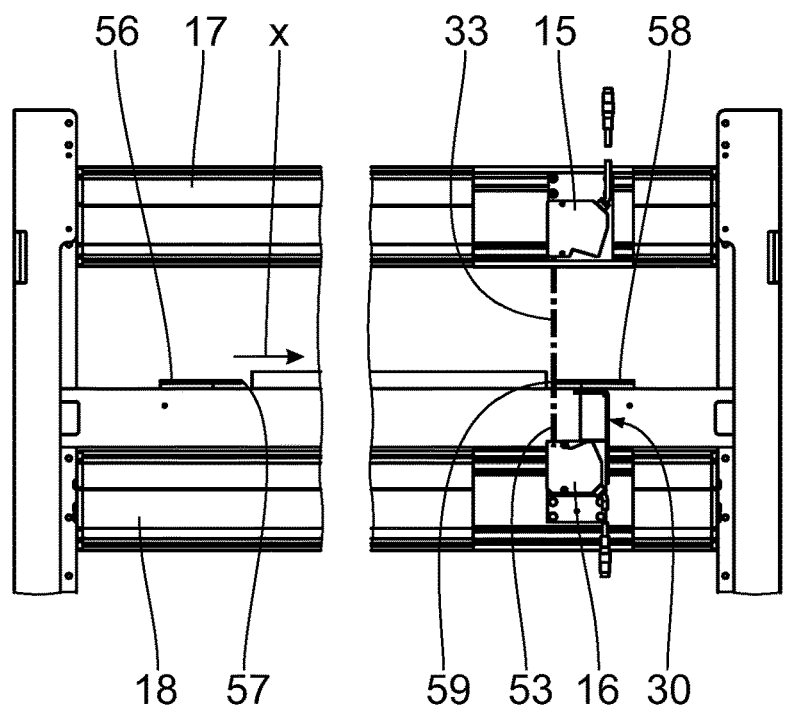
FIG. 16 is a view of a device of FIG. 13 for determining the quality of a corrugated board web for showing an example of another individual process step.

The laser sensor units 15, 16 drive to the end reference element 58, wherein the laser beams 33, 53 jointly impact upon the end reference edge 59 there as shown in FIG. 16. A balancing of the measurement by means of the end reference edge 59 then follows at the end of the measurement path of the laser sensor units 15, 16. The distance of the reference edges 57, 59 is measured or calculated. It is taken into consideration during the evaluation of the measurement values.

Figure 17:
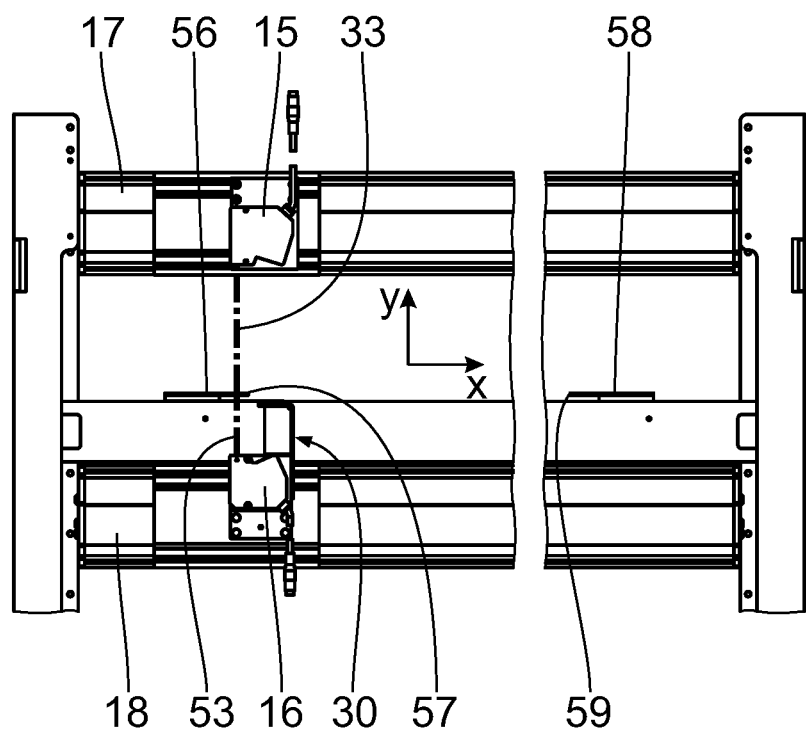
FIG. 17 is a view of a device of FIG. 13 for determining the quality of a corrugated board web for showing an example of another individual process step.

FIG. 17 shows a zeroing of the laser sensor units 15, 16 along transversing axis y. This is once again realized prior to the start of the actual measurement and is in particular of importance for an exact measurement of the thickness of the corrugated board web 1 and its groove depth. The laser beams 33, 53 here jointly impact upon the start reference element 56, which has a defined or known thickness. They are substantially aligned with each other. Balancing can also be carried out if necessary.

The embodiments of FIGS. 13 to 17 substantially apply in context to the offset in transport direction 12.

Figure 18:
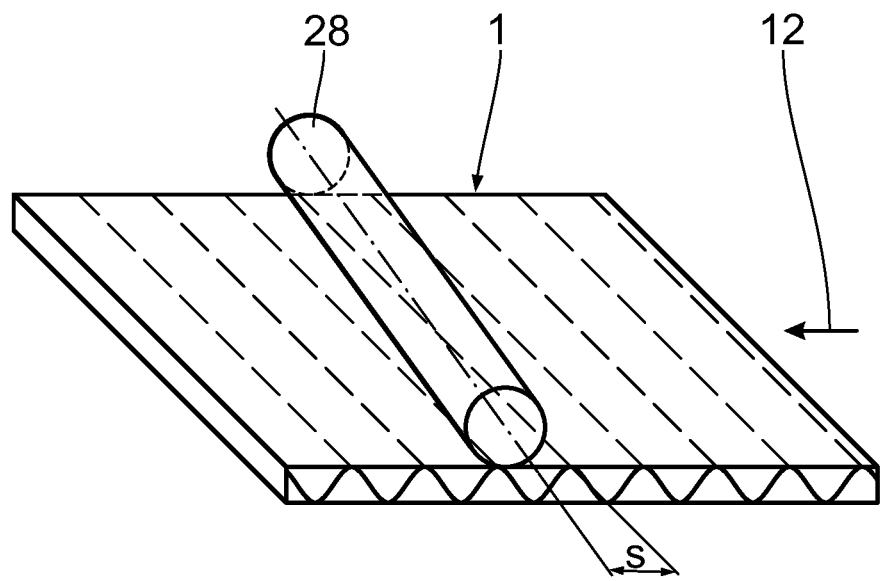
FIG. 18 is a simplified perspective view showing a preferred arrangement of a guide roller of the device for determining the quality of a corrugated board web.
Figure 19:
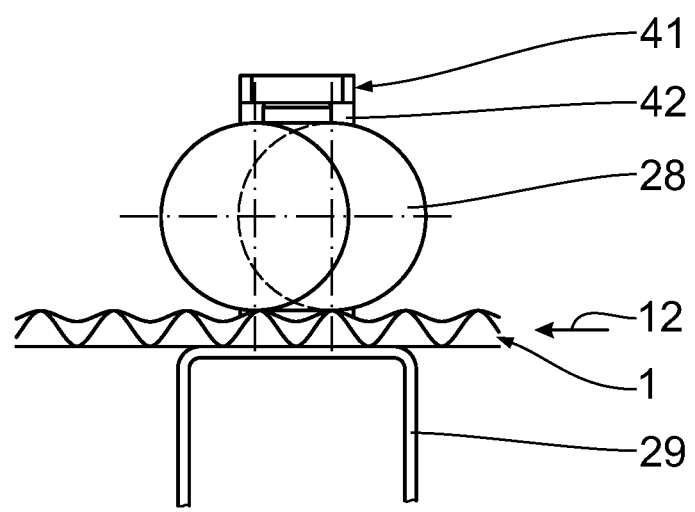
FIG. 19 is a side view of FIG. 18.

With the further embodiment of the quality determination device 14 according to FIGS. 18, 19 the bracket roller 28 is set obliquely in relation to the corrugated board web 1. It therefore extends obliquely to the transport direction 12 of the corrugated board web 1, or obliquely to its longitudinal edges. Compared to a perpendicular alignment of the bracket roller 28 to the corrugated board web 1 it is set obliquely. Alternatively the bracket roller 28 is for example arranged vertical to the transport direction 12 of the corrugated board web 1, or vertical to its longitudinal edges.

Combinations of the embodiments are possible.

While specific embodiments of the invention have been shown and described in detail to illustrate the application of the principles of the invention, it will be understood that the invention may be embodied otherwise without departing from such principles.

The invention claimed is:

1. A device for determining a quality of a moving corrugated board web with at least one cover web and at least one corrugated web, the device comprising:
    a quality determination sensor arrangement comprising a first quality determination sensor unit and a second quality determination sensor unit, the first quality determination sensor unit facing a first side of the corrugated board web, for determining the quality of the corrugated board web on the first side, the second quality determination sensor unit facing a second side of the corrugated board web opposite the first side of the corrugated board web, for determining the quality of the corrugated board web on the second side; and
    an evaluation unit in signal connection with the quality determination sensor arrangement, the evaluation unit evaluating signals of the quality determination sensor arrangement with regard to the quality of the corrugated board web, wherein a calibration arrangement comprises at least one calibration part, arranged at the second quality determination sensor unit, for reflecting a first measuring beam of the first quality determination sensor unit back to the first quality determination sensor unit in an absence of a corrugated board web, wherein the calibration arrangement calibrates the quality determination sensor arrangement, the first quality determination sensor unit and the second quality determination sensor unit being arranged offset from each other, transverse to a transport direction of the corrugated board web, during a calibration process.

2. A device according to claim 1, wherein the evaluation unit is capable of determining a smoothness of the corrugated board web on at least one of the first side and the second side, at least in some areas, for determining the quality of the corrugated board web.

3. A device according to claim 1, wherein the evaluation unit actuates at least one upstream device in dependence on a detected deviation from a target value, wherein the at least one upstream device is capable of reducing the detected deviation.

4. A device according to claim 1, further comprising at least one guide means for guiding the corrugated board web arranged adjacent to the quality determination sensor arrangement and allocated to the corrugated board web.

5. A device according to claim 4, wherein a guide gap of the at least one guide means is changeable.

6. A device according to claim 4, wherein the at least one guide means comprises at least one guide roller in contact with the corrugated board web for guiding the corrugated board web.

7. A device according to claim 6, wherein the at least one guide means comprises at least one guide table for supporting the corrugated board web.

8. A device according to claim 6, wherein the at least one guide roller is set obliquely in relation to the corrugated board web.

9. A device according to claim 7, wherein the at least one guide roller and the at least one guide table are arranged adjacent to each other and delimit a guide gap, through which the corrugated board web passes.

10. A device according to claim 4, wherein the at least one guide means is arranged above and below the corrugated board web.

11. A device according to claim 1, wherein the first quality determination sensor unit and the second quality determination sensor unit are active during the calibration process, wherein the first measuring beam impacts upon the at least one calibration part and the evaluation unit generates a calibration curve by means of at least one of the first quality determination sensor unit and the second quality determination sensor unit.

12. A device according to claim 1, wherein the calibration arrangement comprises at least one measuring reference element.

13. A plant for producing a corrugated board web laminated on at least one side, the plant comprising:
   at least one device for producing the corrugated board web laminated on one side; and
   at least another device located after the at least one device for producing the corrugated board web laminated on one side, the at least another device comprising a quality determination sensor arrangement, the quality determination sensor arrangement comprising a first quality determination sensor unit and a second quality determination sensor unit, the first quality determination sensor unit facing a first side of the corrugated board web, for determining the quality of the corrugated board web on the first side, the second quality determination sensor unit facing a second side of the corrugated board web opposite the first side of the corrugated board web for determining the quality of the corrugated board web on the second side, the at least another device further comprising an evaluation unit in signal connection with the quality determination sensor arrangement, the evaluation unit evaluating signals of the quality determination sensor arrangement with regard to the quality of the corrugated board web, wherein a calibration arrangement comprises at least one calibration part, arranged at the second quality determination sensor unit, for reflecting a first measuring beam of the first quality determination sensor unit back to the first quality determination sensor unit in an absence of a corrugated board web, wherein the calibration arrangement calibrates the quality determination sensor arrangement, the first quality determination sensor unit and the second quality determination sensor unit being arranged offset from each other, transverse to a transport direction of the corrugated board web, during a calibration process.

14. A device according to claim 1, wherein the at least one calibration part extends transverse to the transport direction of the corrugated board web.

15. A device according to claim 11, wherein the calibration curve serves as a basis for a subsequent quality determination of the corrugated board web.

16. A device for determining a quality of a moving corrugated board web with at least one cover web and at least one corrugated web, the device comprising:
   a quality determination sensor arrangement comprising a first quality determination sensor unit and a second quality determination sensor unit, the first quality determination sensor unit facing a first side of the corrugated board web, for determining the quality of the corrugated board web on the first side, the second quality determination sensor unit facing a second side of the corrugated board web opposite the first side of the corrugated board web, for determining the quality of the corrugated board web on the second side; and
   an evaluation unit in signal connection with the quality determination sensor arrangement, the evaluation unit evaluating signals of the quality determination sensor arrangement with regard to the quality of the corrugated board web, wherein a calibration arrangement comprises at least one calibration part, arranged at the second quality determination sensor unit, for reflecting a first measuring beam of the first quality determination sensor unit back to the first quality determination sensor unit in an absence of a corrugated board web, wherein the calibration arrangement calibrates the quality determination sensor arrangement, the first quality determination sensor unit being arranged upstream of the second quality determination sensor unit and the second quality determination sensor unit being arranged downstream of the first quality determination sensor unit during a calibration process with respect to a transport direction of the corrugated board web.

17. A device according to claim 16, wherein the first quality determination sensor unit and the second quality determination sensor unit are offset from each other during the calibration process, transverse to the transport direction of the corrugated board web.

18. A device according to claim 17, wherein the first quality determination sensor unit faces a first area and the second quality determination sensor unit faces a second area during the calibration process, the first area being located upstream of the second area with respect to the transportation direction of the corrugated board web.

19. A device according to claim 16, wherein the first quality determination sensor unit and the second quality determination sensor unit are active during the calibration process, wherein the first measuring beam impacts upon the at least one calibration part and the evaluation unit generates a calibration curve by means of at least one of the first quality determination sensor unit and the second quality determination sensor unit.

20. A device according to claim 16, wherein the first measuring beam is emitted on a first area via the first quality determination sensor unit and the second quality determination sensor unit emits a second laser beam on a second area, the first area being located upstream of the second area with respect to the transportation direction of the corrugated board web.

* * * * *